US012682532B2

(12) United States Patent (10) Patent No.: US 12,682,532 B2
Jimenez et al. (45) Date of Patent: Jul. 14, 2026

(54) APPARATUS, SYSTEMS AND METHODS FOR ANIMATION DATA

(71) Applicant: Sony Interactive Entertainment Inc., Tokyo (JP)

(72) Inventors: Daniel Israel Pereira Jimenez, London (GB); Estefania Rodriguez Quiros, London (GB); Lazaros Michailidis, London (GB); Jesus Lucas Barcias, London (GB); Christopher William Henderson, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 106 days.

(21) Appl. No.: 18/440,097

(22) Filed: Feb. 13, 2024

(65) Prior Publication Data

US 2024/0282034 A1 Aug. 22, 2024

(30) Foreign Application Priority Data

Feb. 22, 2023 (EP) ..................................... 23386015

(51) Int. Cl.
G06T 13/80 (2011.01)
G06T 13/40 (2011.01)
(52) U.S. Cl.
CPC .............. *G06T 13/40* (2013.01); *G06T 13/80* (2013.01)

(58) Field of Classification Search
CPC ......... G06T 13/40; G06T 13/80; G06F 16/40; G06F 16/7328
See application file for complete search history.

(56) References Cited

U.S. PATENT DOCUMENTS

2007/0064005 A1* 3/2007 Antoine ................ G06F 3/1454
345/473
2015/0062131 A1 3/2015 Chann
2024/0353922 A1* 10/2024 Dedonato ............... G06T 13/80

FOREIGN PATENT DOCUMENTS

GB 2454681 A 5/2009

OTHER PUBLICATIONS

Extended European Search Report for corresponding EP Application No. 23386015.4, 6 pages, dated Aug. 2, 2023.

* cited by examiner

*Primary Examiner* — Antonio A Caschera
(74) *Attorney, Agent, or Firm* — Kilpatrick Townsend & Stockton LLP

(57) ABSTRACT

A data processing apparatus includes storage circuitry to store animation data for a computer generated environment, the animation data specifying animations of animated objects of the computer generated environment for a period of time, selection circuitry to receive an animation data request and to select a portion of the animation data in dependence on the animation data request, and output circuitry to output the portion of the animation data.

20 Claims, 4 Drawing Sheets

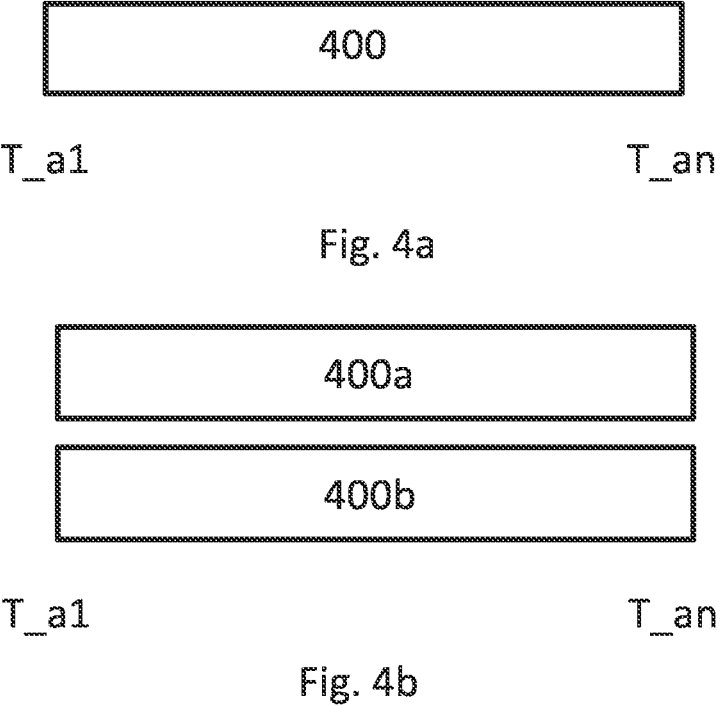
Fig. 4a
Fig. 4b
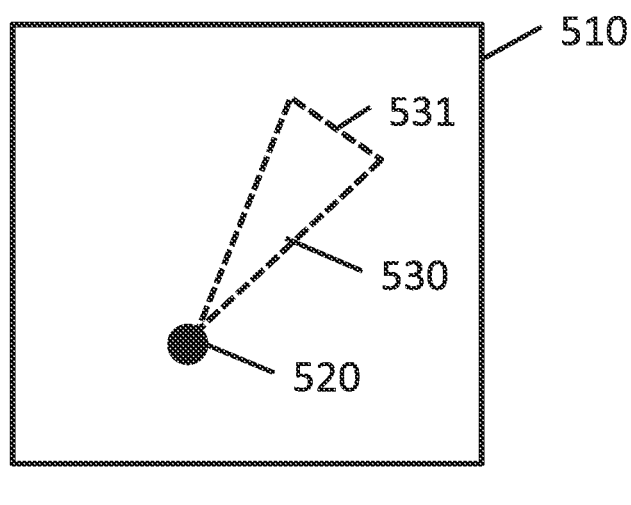
Fig. 5

APPARATUS, SYSTEMS AND METHODS FOR ANIMATION DATA

FIELD OF THE INVENTION

The present disclosure relates to the field of processing data, and more particularly to processing associated with animation data for a computer generated environment.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Developers of content for computer generated environments generally seek to provide content with increasing detail and improved immersion. However, with such computer generated environments, there is typically a need for processing devices with greater capabilities in order to store and/or process the data associated with these computer generated environments. Therefore, development of content for computer generated environments has typically been restricted according to processing capabilities of certain devices. An example of this is the release of the Sony® PlayStation® 5 which, due to the processing improvements over the previous generation Sony® PlayStation® 4, facilitated the creation of video games and other interactive content with more detailed and sophisticated computer generated environments. Hence, whilst it is desirable to provide ever more detailed and immersive computer generated environments, the processing associated with such amounts of data can be restrictive such that developers may seek to simplify certain aspects of content and/or restrict the content to use with certain devices having certain capabilities.

It is in this context that the present disclosure arises.

SUMMARY OF THE INVENTION

Various aspects and features of the present invention are defined in the appended claims and within the text of the accompanying description.

BRIEF DESCRIPTION OF THE DRAWINGS

The present technique will be described further, by way of example only, with reference to embodiments thereof as illustrated in the accompanying drawings, in which:

FIGS. 4a and 4b are schematic diagrams illustrating animation data specifying animations of animated objects of a computer generated environment for a time duration;

FIG. 5 is a schematic diagram illustrating a viewpoint with respect to a computer generated environment.

DESCRIPTION OF THE EMBODIMENTS

Figure 1:
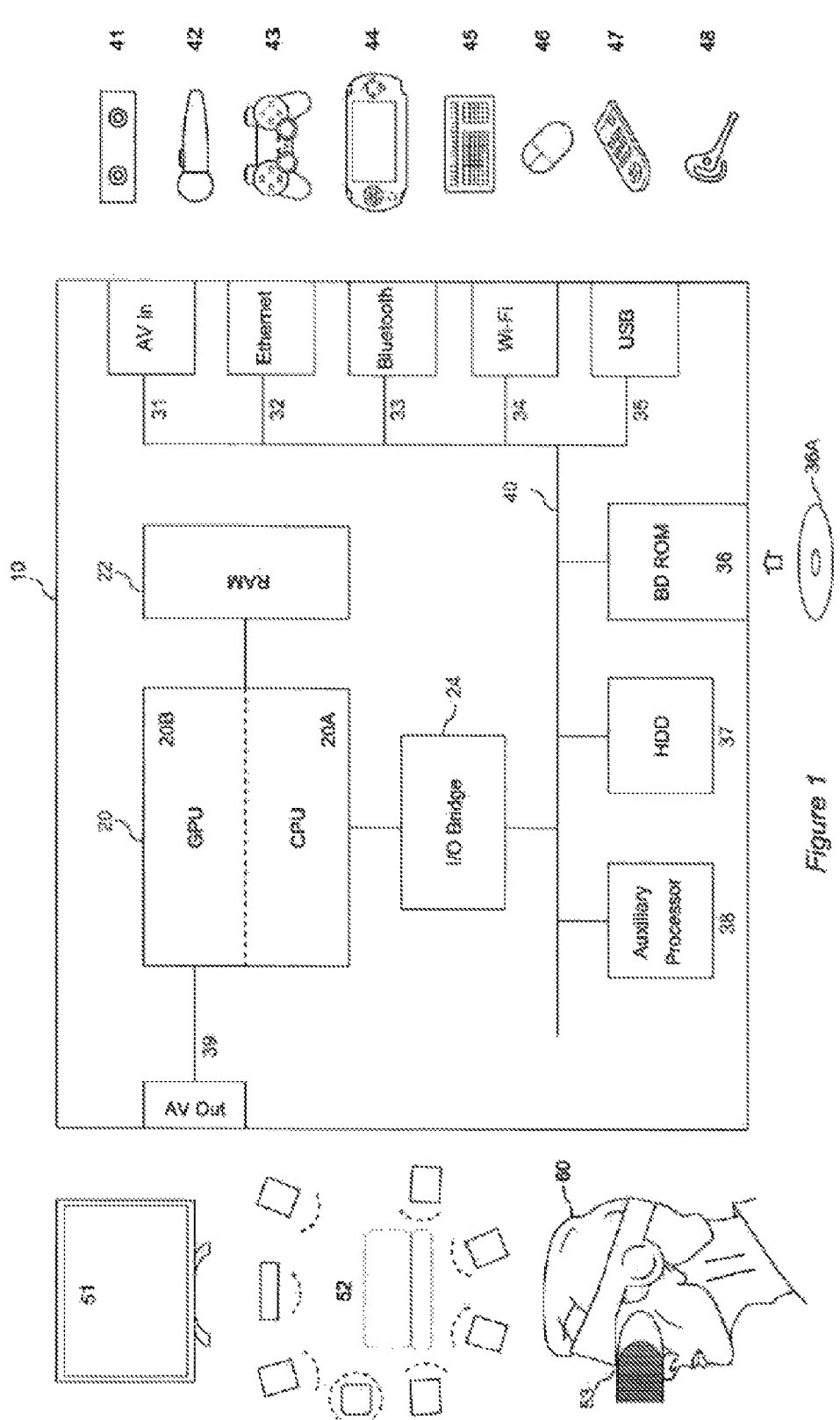
FIG. 1 is a schematic diagram illustrating an example of an entertainment device.

Embodiments of the invention will now be described, by way of example only, with reference to the accompanying drawings, in which:

FIG. 1 schematically illustrates an example entertainment device such as the Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-Ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4® or DualSense®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, processes data and generates video images (image data) and optionally audio for output via the AV output 39. Optionally, the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

FIG. 1 therefore provides an example of an entertainment device suitable for performing processing for executing an instance of an interactive gaming application and generating images and audio for output to a user. The entertainment device may for example generate images for display by a display device such as the television 51 and/or the head mounted display unit 53.

Figure 2:
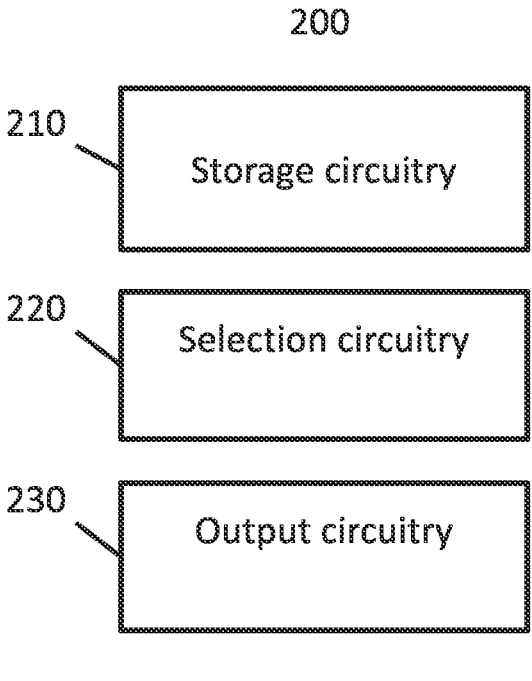
FIG. 2 is a schematic diagram illustrating a data processing apparatus.

FIG. 2 schematically illustrates a data processing apparatus in accordance with embodiments of the disclosure.

The data processing apparatus 200 comprises storage circuitry 210, selection circuitry 220 and output circuitry

230. The storage circuitry 210 is configured to store animation data for at least one computer generated environment, the animation data specifying animations of a plurality of animated objects of the computer generated environment for a period of time. The computer generated environment may be any suitable environment comprising a plurality of animated objects and the animation data may specify animations for those animated objects for a period of time that may be of any suitable duration. In some cases, the computer generated environment may be a virtual environment for a video game. For example, the animation data may specify animations for various animated objects in a virtual game world by specifying animations for the animated objects for a period of time.

The animation data comprises at least first object animation data specifying one or more animations for a first object of the computer generated for at least some of the period of time and second object animation data specifying one or more animations for a second object of the computer generated for at least some of the period of time. More generally, the animation data may correspond to a computer generated environment comprising a number of objects (potentially a large number of the order of tens, hundreds or even thousands) and the animation data can specify animations for the objects for the period of time.

In some examples, the storage circuitry 210 stores animation data for a computer generated environment comprising N respective objects, in which the animation data specifies animations for each of the N respective objects for the period of time, and in which N is an integer value in the range 2 to 10000. In some examples the computer generated environment may correspond to a virtual world capable of being navigated by a user, such as a virtual game world for a video game (e.g. a game world for a massively multiplayer online game or a single player game). In such cases, the animation data may specify animations for a large number of animated objects and possibly for a duration of time of the order of minutes, hours or even days.

More generally, the animation data specifies animations for animated objects of the compute generated environment for a period of time, and the period of time may be of any suitable length. In some examples, the period of time may have a value in the range of 0.1 to 8760 hours. In various examples, the period of time may be of the order of seconds, minutes, hours, days, weeks, months or even years.

For example, the animation data may specify animations for a plurality of animated objects for a time period of thirty seconds so that the animation data is used in a looping fashion with animations being repeatedly used. The animation data may specify animations for a time period of one day so that a given object can be animated for a duration of one day without requiring reusing of previous animations for the object. Similarly, the animation data may specify animations for a time period of one month or one year.

In some examples, the animation data may specify animation data for a virtual object with one or more visual properties of the object being varied over the period of time. For example, the animation data may specify animation data for an object such as a virtual tree with the virtual tree having a first appearance (e.g. with leaves) for a first portion of the time period and a second appearance (without leaves) for a second portion of the time period.

More generally, the animation data may specify animation data for a computer generated environment having an associated time of day and/or time of year. The animation data can thus specify animations for objects for a virtual day or a virtual year in a content (of course, a virtual day in a content may in fact correspond to a much smaller duration of real time, such as 30 minutes).

The precomputed animation data stored by the storage circuitry 210 may correspond to a computer generated environment for a video game application such as a single player or multiplayer video game of a type such as a first-person shooter, role playing or action-adventure game. The type of video game is not particularly limited.

In some embodiments of the disclosure, the animation data comprises at least one of: animation frames specifying animation sequences and model data for the animated objects; and image frames comprising images visually depicting temporally changing animated objects.

The storage circuitry 210 may store animation frames which specify an animation sequence that can be applied to an associated 2D or 3D model to animate the model. In particular, the storage circuitry 210 may store animation frames which specify a sequence of transforms. The model data may for example comprise one or more of point cloud data and polygonal mesh data. In some embodiments of the disclosure, the animation data comprises polygonal mesh data and associated animation frames specifying a sequence of transforms to be applied for defining respective poses of the polygonal mesh data at respective times. The transforms may be defined for each successive animation frame, such that the temporal variation in the transforms corresponds to the polygonal mesh performing a particular motion. Transforms can be associated with vertices of the polygonal mesh for specifying transforms to be applied to the vertices. The transforms may be represented as float values for example, as is the case in the Unreal 4™ game engine.

Alternatively or in addition, the storage circuitry 210 may store image frames visually depicting at least some of an animation for an animated object by depicting temporal variations in a pose of the animated object. The image frames may depict a complete animation or may depict just key states within the animation. In some examples, the image frames may be so-called key frames depicting at least a start pose and an end pose of an animation. Moreover, in some examples, the storage circuitry can store a plurality of key frames for an animation of a respective animated object depicting salient poses during the animation. The key frames are capable of being processed to generate an image sequence of the full animation based on interpolation of the key frames. Hence, in some examples image frames depicting at least a portion of an animation (or more specifically key states during the animation) can be stored.

As explained in more detail later, the computer generated environment may comprise non-humanoid objects and the animation data can specify animations for one or more of the non-humanoid objects of the computer generated environment. For example, the animation data may specify animations for objects associated with computer generated virtual environments such as plants, trees, buildings, waterfalls, animals, clouds and rivers. Of course, in some examples, the animation data may also specify animations for one or more humanoid animated objects of the computer generated environment. For example, humanoid characters such as an individual character (e.g. pedestrian walking in an urban environment comprising other environmental objects) may be included.

Referring again to FIG. 2, the data processing apparatus 200 is operable to store animation data for a computer generated environment. The selection circuitry 220 is configured receive an animation data request and to select a portion of the animation data in dependence on the animation data request. Hence some of the animation data for the computer generated environment can be selected depending on the animation data request. Techniques for selecting a portion of the animation data depending on an animation data request are discussed in more detail later. The output circuitry 230 is configured to output the portion of the animation data selected by the selection circuitry 220. Therefore, the data processing apparatus 200 can receive a given animation data request for requesting animation data associated with the computer generated environment, the selection circuitry 220 can select a portion of the animation data stored by the storage circuitry 210 in dependence on the given animation data request, and the output circuitry 230 can output the portion of the animation data so that the animation data can be output to another device for viewing. The animation data generally comprises data which can be processed at one or more other devices (e.g. the entertainment device of FIG. 1) for generating image frames for display to thereby allow viewing of the animations. The data output by the processing apparatus 200 may in some examples be compressed using any suitable data compression format.

The animation data request may be received by the data processing apparatus 200, directly or indirectly (e.g. via one or more intermediate devices) from a device such as a client device or a game server, or other suitable device. In some examples, the data processing apparatus 200 may be provided as part of a user device (such as the entertainment device described with reference to FIG. 1). In some examples, the data processing apparatus 200 may be provided as part of a server apparatus. For example, the server apparatus may be a server provided for hosting interactive gaming sessions or a game management server.

However, in some cases for which the animation data specifies animations for a relatively large number of objects of a computer generated environment and/or for a relatively long period of time, storage and/or processing of the entirety of the animation data by a user device (e.g. game console, personal computer or smartphone device) may be not possible or not practical. Hence, in some embodiments of the disclosure, the data processing apparatus 200 can be provided as part of a server apparatus, and the data processing apparatus 200 can receive an animation data request and output a portion of the animation data in dependence on the request so that user devices can acquire a portion of the animation data. Hence, a portion of the animation data specifying animations for some of the computer generated environment, and thus having a smaller data size compared to the entirety of the animation data for the computer generated environment, can be provided to a user device (or more generally, another device). This can allow the development and creation of computer generated environments having potentially large amounts of animation (e.g. large numbers of animated objects and/or sophisticated levels of animation and/or animations spanning relatively long time periods) whilst allowing users to experience these environments using devices that may not be capable of (or not be suited to) storing and/or processing of such large amounts of animation.

Figure 3:
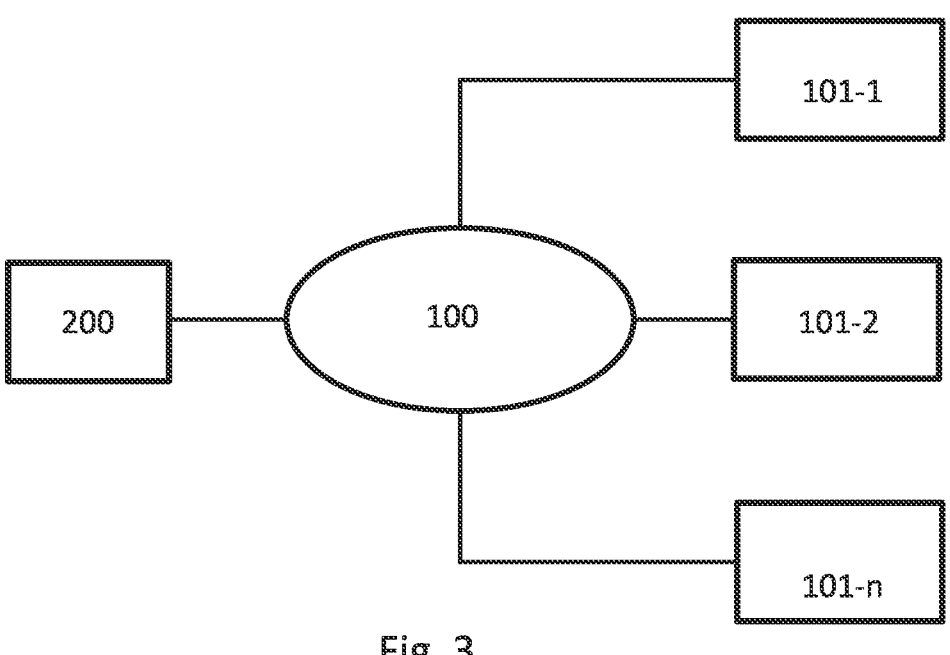
FIG. 3 is a schematic diagram illustrating a system.

FIG. 3 schematically illustrates an example of a system comprising the data processing apparatus 200. The system comprises the data processing apparatus 200 which communicates with the client devices 101-1, 101-2 . . . 101-n via the network 100. Whilst this example shows three client devices, the number of client devices is not particularly limited and there may be any suitable number of client devices (n may be any suitable value).

In example of FIG. 3, the data processing apparatus 200 may be a server apparatus. The data processing apparatus 200 may thus receive animation data requests via the network 100. In response to an animation data request, the data processing apparatus 200 selects and outputs a portion of the animation data stored by the storage circuitry 210. The client devices may be devices such as the entertainment device described with reference to FIG. 1, or other similar devices having display functionality such as a smartphone or tablet device or a general purpose computing device connected to a display unit. In some examples, the data processing apparatus 200 may receive, from a first client device (e.g. 101-1), a first animation data request and output a first portion of the animation data in dependence on the first animation data request, and the data processing apparatus 200 may receive, from a second client device (e.g. 101-2), a second animation data request and output a second portion of the animation data in dependence on the second animation data request. More generally, the data processing apparatus 200 can perform selection with respect to the stored animation data in response to animation data requests and output selected portions of animation data.

For example, respective users may each participate in their own interactive game session using their own client devices (e.g. entertainment devices). During an interactive game session, the client device may transmit animation data requests for requesting animation data for a part of the computer generated environment that is relevant to that interactive session.

FIG. 4a schematically illustrates and example of animation data 400 specifying animations for animated objects of a computer generated environment for a period of time. In the example of FIG. 4a, the period of time is shown as starting at time T_a1 and ending at time T_an, such that time progresses from left to right in FIG. 4a. As explained previously, this time period may be of any suitable duration. The selection circuitry 220 is configured to select, from animation data 400, a portion in dependence on an animation data request.

References to selecting a portion of the animation data 400 refer to selecting a time-based segment of the animation data 400 and/or selecting animation data for some (a subset of) the animated objects for which the animation data 400 is stored. For example, a selected portion of the animation data 400 may comprise animation data for specifying animations for a subset of the animated objects for a subset of the period of time between the beginning time T_a1 and the ending time T_an.

The stored animation data 400 is precomputed and stored by the storage circuitry 210. In particular, for examples including large and/or feature rich computer generated environments (e.g. with a large number of animated objects), this may result in a large data size of the animation data 400. Rather than user devices acquiring and storing all of the animation data 400 (which may result in the animation data not being capable of being used by certain devices and/or developers having to simplify aspects of the animation data for use by certain devices), the data processing apparatus 200 can receive an animation data request and select and output a portion of the precomputed animation data 400 so that other devices, (e.g. client devices) for which hardware capabilities may not be suited (or poorly suited) to storing and/or processing of the large amounts of animation data, can acquire a portion of the animation data. This can be particularly beneficial for feature rich computer generated environments for which the animation data can potentially have data sizes that may otherwise restrict or limit use by some devices. In addition, the animation data 400 can be created to provide high quality animations for a potentially large number of animated objects in the environment and, by using a selection of a portion of the animation data, a data size associated with the selected portion can still be capable of being stored and/or processed by devices that may not be capable of (or poorly suited to) processing the entirety of the animation data 400.

In some embodiments of the disclosure, the animation data (e.g. animation data 400) for the computer generated environment comprises a first predetermined portion of animation data for a first region of the computer generated environment and a second predetermined portion of animation data for a second region of the computer generated environment, and the selection circuitry is configured to select, as the portion of the animation data, one of the first predetermined portion and the second predetermined portion in dependence on the animation data request. In some examples, the animation data can be partitioned (divided) into two or more portions of animation data. This can be achieved by pre-processing the animation data to segment the animation data into segments that correspond to different regions of the computer generated environment. Hence, selection can be performed depending on an animation data request to select at least one of the portions of the animation data. The animation data may for example be partitioned so that each predetermined portion corresponds to a same sized region of the computer generated environment. Alternatively or in addition, the animation data may for example be partitioned so that each predetermined portion has a same (or substantially same) data size.

FIG. 4b schematically illustrates an example in which animation data 400a, 400b is stored for a given computer generated environment. For example, two or more different versions of animation data (e.g. version 400a and version 400b) may be stored for two or more versions of a given computer generated environment. Animation data 400a, 400b for two versions of a computer generated are shown for case of explanation. The animation data 400a may for example relate to high quality animation data, and the animation data 400b may for example relate to low quality animation data. Hence, for a given computer generated environment, animation data of at least a first quality and a second quality can be precomputed and stored, and selection can be performed to select a portion of animation data from any of the versions having different quality. Alternatively or in addition, the animation data 400a and 400b may both correspond to a same computer generated environment with a same quality for the animation data but with different visual appearances and animations for the objects. For example, animation data 400a may relate to a forest environment in the spring, whereas animation data 400b may relate to the forest environment in the winter (e.g. including snow and possibly bare deciduous trees) or the forest environment during a forest fire. For example, the animation data 400a and 400b may comprise different textures to be applied to polygonal meshes for this purpose, or in some cases the image frames depicting the animated objects may have been precomputed for the different themes.

Hence more generally, in some embodiments of the disclosure the storage circuitry can store animation data for a first version of the computer generated environment and second version of the computer generated environment, the first version of the computer generated having a different visual appearance and different animations to the second version. For example the first version may relate to the environment in the winter and with corresponding visual appearances and corresponding animations for the objects, and the second version may relate to the environment in the summer with corresponding visual appearances and corresponding animations for the objects. Similarly, the first version may relate to the environment during an event such as a fire or a storm with the objects having appropriate visual appearances and animations, and the second version may relate to the environment under different circumstances (e.g. a different event) such as a flood event. At least some of the objects represented by the first version are also represented by the same version but with a different visual appearance and different animation properties.

In some embodiments of the disclosure, the selection circuitry 220 is configured to select, as the portion of the animation data, one or more of: animation data specifying animations for a subset of the animated objects of the computer generated environment; and a time-based segment of the animation data for at least some of the computer generated environment, the time based-segment corresponding to a portion of the period of time. Techniques for selecting a portion of the animation data depending on an animation data request will now be discussed.

In some embodiments of the disclosure, an animation data request received by the data processing apparatus 200 may be one of a first type of animation data request or a second type of animation data request. Two types of animation data request are considered. A first type of animation data request may in some cases indicate only that animation data is requested without specifying one or more animation data request properties. A second type of animation data request may specify one or more animation data request properties so that selection can be performed based on one or more of the animation data request properties.

Referring to the case of a first type of animation data request, the data processing apparatus can receive the animation data request and select a portion of the animation data in dependence on the animation data request by selecting a time-based segment of the animation data for the computer generated environment. The data processing apparatus 200 may select a time-based segment of the animation data starting from a start point corresponding to a beginning time (e.g. T_a1 in FIG. 4a) of the stored animation data and select the time-based segment according to a predetermined duration. Alternatively or in addition, the data processing apparatus 200 may select a time-based segment of the stored animation data starting from a start point which is indicated by a control value. For example, the data processing apparatus 200 may comprise control circuitry (not shown in FIG. 2) configured to maintain the control value. The control value may be periodically updated so that at any given time the control value corresponds to a respective time within the time period of the stored animation data. Hence, referring to the example of FIG. 4a, the control value may be periodically updated so that the control value moves from left to right in FIG. 4a, and upon reaching the ending time T_an, the control value is next updated to correspond to the beginning time T_a1 and so on. Hence, the selection circuitry 220 can be configured to select a portion of the animation data in dependence on the animation data request and the control value when performing the selection. For example, the control value may correspond to a clock associated with the animation data and the computer generated environment so that a time-based segment of the animation data starting from a point in the animation data indicated by the control value can be provided. For example, the animation data may be provided for a so-called live virtual world (which may be a persistent virtual world) for which the control value corresponds to a clock associated with the virtual world. More generally, the control value is capable of being evaluated with respect to the animation data for specifying a respective point in time within the time period (T_a1 to T_an) of the animation data.

Referring to the case of a second type of animation data request, the data processing apparatus 200 can receive the animation data request indicative of one or more animation data request properties, and the selection circuitry 220 can be configured to select the portion of the animation data in dependence upon one or more of the animation data request properties. Referring to the above example including the control value, in some cases such a value may be indicated by the animation data request and thereby used to select a portion of the animation data starting at a time identified based on the control value, and in such cases the control circuitry may not be provided at the data processing apparatus 200.

The animation data request may be indicative of at least one of a time property with respect to the duration of the animation data and a spatial property with respect to the computer generated environment.

In some embodiments of the disclosure, an animation data request is indicative of at least one of a respective time and a time duration with respect to the period of time. Referring again to FIG. 4a, an animation data request may be indicative of a respective time within the time period T_a1 to T_an to thereby indicate a point of time in the animation data from which the requested portion of animation data is to start. As explained previously, in some cases the selection circuitry 220 may be configured to select a time-based segment according to a predetermined duration (e.g. Y seconds which can be any suitable value that is less than the total duration of the animation data). Hence, a time-based segment of a predetermined duration starting at a time point indicated by the animation data request can be selected. In such cases where only a timing property is indicated, the time-based segment may comprise animation data for each of the animated objects in the computer generated environment.

Alternatively or in addition, an animation data request may be indicative of a time duration with respect to the period of time. In some cases, the selection circuitry 220 can be configured to select a portion of the animation data to have a duration corresponding to the time duration indicated by the animation data request, and the start point of the selected portion can be determined according to the control value discussed above, which may be maintained by the control circuitry of the data processing apparatus, or by a respective time when also indicated by the request.

In some cases, the animation data request may be indicative of a respective time and a time duration. In such cases, the selection circuitry 220 can be configured to select a portion of the animation data to have a duration corresponding to the time duration indicated by the animation data request, and the start point of the selected portion can be determined according to the respective time indicated by the animate data request. For example, the animation data request may be indicative of a respective time of T_a2 (which is later than the beginning time T_a1 and earlier than the ending time T_an in FIG. 4a) and a time duration (e.g. Y seconds).

In some embodiments of the disclosure, the animation data for the computer generated environment comprises timestamp information, and the selection circuitry 220 can be configured to select a time-based segment of the animation data within the period of time in dependence on the animation data request and the timestamp information. The animation data stored by the storage circuitry 210 may also comprise timestamp information which can be evaluated with respect to one or more timing properties indicated by an animation data request for selection of a portion of the animation data. For example, the animation data may comprise frames (animation frames and/or key frames) for specifying the animation data within the period of time, and each frame may be associated with a timestamp. In some examples, a first sequence of frames may specify animations for one or more first objects of the computer generated environment and each frame having an associated timestamp, and a second sequence of frames may specify animations for one or more second objects of the computer generated environment and each frame having an associated timestamp. For example, the first sequence of frames may specify animations for a respective object or may specify animations for a plurality of respective objects located in a same region of the computer generated environment.

In some embodiments of the disclosure, the selection circuitry 220 is configured to match a respective timestamp of the timestamp information with a timestamp associated with the animation data request and select a time-based segment of the animation data based on the respective timestamp of the timestamp information. Timestamp matching can thus be performed to identify a respective timestamp of the timestamp information, and the identified timestamp can be used to define the start point for the selected portion of animation data.

In some embodiments of the disclosure, an animation data request is indicative of at least one of a spatial coordinate with respect to the computer generated environment and a spatial portion of the computer generated environment. The animation data request may be indicative of a spatial coordinate for specifying a 2D or 3D position in relation to the computer generated environment. The selection circuitry 220 can be configured to select a portion of the animation data in dependence on a spatial coordinate indicated by the animation data request.

The animation data for the computer generated environment may specify animations for X animated objects of the computer generated environment, and the selection circuitry can be configured to select animation data specifying animations for a subset (e.g. Y) of the animated objects of the computer generated environment in dependence upon a spatial coordinate, where Y is smaller than X. For example, based on the spatial coordinate and a predetermined distance, a portion of the computer generated environment within the predetermined distance of the spatial coordinate can be calculated. Then, for the time-based segment of the animation data that is to be selected, selection from the animation data included in that time-based segment can be performed to select animation data for animated objects that have a position that corresponds to the calculated portion of the computer generated environment. In this way, animation data for animated objects that intersect the calculated portion of the environment during the time-based segment can be selected. This can allow selection of animation data for animated objects that are fixed (e.g. a tree object that sways in the wind) and also animation data for other animated objects that may transit through the calculated portion (e.g. a falling leaf) during the time-based segment. The above example refers to selecting a time-based segment of the animation data and selecting animation data for a subset of the animated objects that correspond to the calculated portion of the environment. However, in some examples selection from the animation data depending on an animation data request indicating a spatial coordinate and/or spatial portion of the computer generated environment may be performed to select animation data for a subset of the animated objects for the full duration of the time period. In this case, animation data for animated objects that intersect the calculated portion of the environment at any point during the duration of the animation data may be selected.

Hence more generally, in some cases an animation data request may indicate a spatial coordinate, and the selection circuitry can be configured to calculate a portion of the computer generated environment in dependence on the spatial coordinate and select animation data for the calculated portion of the computer generated environment. The selection circuitry can be configured to evaluate position information for a given animated object in the animation data with respect to the calculated portion and select animation data associated with the given animated object depending on whether the given animated object corresponds to the calculated portion.

Alternatively or in addition, the animation data request may be indicative of a spatial portion of the computer generated environment. For example, the animation data may be indicative of two or more spatial coordinates for specifying an area or volume within the computer generated environment for which animation data is requested. In some examples, the animation data request may specify a 2D area or 3D volume. In a simplest case, the animation data may indicate two spatial coordinates specifying opposite corners of a square region for which animation data is requested. In some cases, the animation data may indicate a spatial coordinate and a distance such that the spatial coordinate and the distance define a circular area or spherical volume of the computer generated environment. The selection circuitry 220 can be configured to select a portion of the animation data in dependence on a spatial portion indicated by the animation data request.

Hence more generally, in some cases an animation data request may indicate a portion of the computer generated environment and selection can be performed to select animation data for the indicated portion of the computer generated environment. In some cases, the animation data request may indicate a first portion of the computer generated environment, and the selection circuitry may be configured to select animation data for a second portion of the computer generated environment, in which the second portion is larger than an encompasses all of the first portion. In particular, based one or more boundaries associated with the first portion of the computer generated environment, a second portion of the computer generated environment can be calculated which encompasses the first portion. For example, the first portion may be a 2D area or 3D volume, and the second portion may be another portion centred on the first portion with an enlarged size (e.g. Z % greater in area or volume, where in some examples Z may be 5% or 10% for example). In this way, the data processing apparatus 200 can select and output animation data for animated objects included in a portion of the computer generated environment that is larger than and encompasses a portion of the computer generated environment indicated by the animation data request. This can be beneficial for cases where a viewpoint of a user with respect to the environment changes in a way such that animation data has not been requested and acquired for a newly viewed portion of the environment. In cases where the animation data for the second portion has been provided, there is an improved likelihood of the appropriate animation data already being acquired by the user's device for the newly viewed portion of the environment.

In some embodiments of the disclosure, an animation data request is indicative of at least one of a position and an orientation of a viewpoint with respect to the computer generated environment. Referring to FIG. 3, for example, each of the client devices 101-1, 101-2 . . . 101-n, may have an associated display for displaying images of the computer generated environment to a user associated with that client device. A user may provide control inputs using a controller device (e.g. a handheld controller and/or a head-mountable display unit) to control at least one of a position and an orientation of a viewpoint with respect to the computer generated environment. For example, a position and orientation of a viewpoint may be updated in accordance with a tracked pose of an HMD worn on a user's head so that the user can move their head to look around the computer generated environment. For example, the user may have a user controlled viewpoint either for playing a video game (player user) or for spectating (such that the user is a spectating user that does not actively participate) a video game being played by other users. Hence more generally, a client device (e.g. 101-1) can be configured to update at least one of a position and an orientation of a viewpoint in response to one or more user inputs. The client device can be configured to transmit an animation data request indicative of at least one of the position and the orientation of the viewpoint to the data processing apparatus 200 (e.g. via the network 100 as shown in FIG. 3) and the data processing apparatus 200 performs selection and output of a portion of the animation data using the techniques discussed above so that a portion of the animation data can be provided for the client device. In some examples, the client device may periodically transmit animation data requests for periodically requesting animation data.

The selection circuitry can be configured to receive an animation data request indicative of at least one of a position and an orientation of a viewpoint with respect to the computer generated environment and select portion of the animation data in dependence on at least one of the position and the orientation of the viewpoint indicated by the animation data request. FIG. 5 schematically illustrates an example of selection a portion of the animation data (e.g. animation data 400) in dependence on a position and orientation of a viewpoint. Whilst the technique of FIG. 5 is discussed in relation to a 2D example it will be appreciated that the same principles can be applied for selection of animation data for a 3D example.

The example of FIG. 5 shows a section 510 of the computer generated environment and a portion 530 of the computer generated environment for which animation data is selected depending on a viewpoint 520. In the example of FIG. 5, the section 510 may correspond to a relatively small proportion of the computer generated environment and the portion 530 may thus represent a relatively small part of the total size of the computer generated environment. Based on the position and orientation of the viewpoint 530 with respect to the computer generated environment, the portion 530 can be calculated. The portion 530 of the computer generated environment for which animation data is to be selected and output may in some examples be shaped differently from that shown in FIG. 5, and whilst shown as a 2D area in FIG. 5 may in fact be a 3D volume in other examples. FIG. 5 shows an example in which the position and orientation are used to calculate the portion 530 which corresponds to (or encompasses) the field-of-view for the viewpoint. In the examples of FIG. 5, the portion 530 is shown as being truncated at the edge 531, however, in other examples the portion 530 may not be truncated in this way in that the edge 531 may be shaped differently or the portion 530 instead have no truncation such that the portion 530 extends to a limit of the computer generated environment.

Therefore, the portion 530 of the computer generated environment can be calculated in dependence on the viewpoint, and the selection circuitry can be configured to select from the animation data stored by the storage circuitry, animation data for animated objects corresponding to the portion 530. In some cases, only some of the animated objects correspond to the portion 530 of the computer generated environment. For example, in a computer generated environment such as a rainforest including, among other types of objects, a number of trees positioned within the environment, some of the trees may be positioned within the portion 530 whereas other trees (and indeed other objects such as a stream of water and animals) may be positioned outside the portion 530. In this case, animation data for the objects positioned within the portion 530 can be selected.

Hence more generally, in some embodiments of the disclosure the selection circuitry is configured to select animation data associated with a subset of the animated objects in the computer generated environment in dependence on at least one of the position and the orientation of the viewpoint with respect to the computer generated environment.

In some embodiments of the disclosure, for a respective object included in the subset, the selection circuitry is configured to select at least some of the animation data associated with the respective object in dependence on a separation distance between the position of the viewpoint and a position of the respective object so that the selected animation data for the respective object has a first quality when the separation distance has a first value and has a second quality different from the first quality when the separation distance has a second value different from the first value. For a given animated object included in the subset, the selection circuitry can be configured to select, from the stored animation data available for that given object, at least some of the animation data so that a quality associated with the selected animation data for the given object is dependent on a proximity of the given object to the viewpoint (or more generally a spatial coordinate) indicated by the animation data request.

Generally, a given object can be considered to be of lower visual importance for a user's viewing experience when located further away from the viewpoint. Thus, providing high quality animation data in such cases can represent a wasteful use of processing and communication bandwidth resources. The selection circuitry can therefore perform selection with respect to the animation data available for the given object so that a quality associated with the selected animation data for the given object varies depending on a distance separating the given object from the viewpoint so that the selected animation data has a higher quality for a smaller separation distance and a lower quality for a greater separation distance. Therefore, lower quality animation data (thus having a smaller data size) can be selected when the separation distance between the position of the viewpoint and the position of the given object is greater, and higher quality animation data (thus having a larger data size) can be selected when the separation distance between the position of the viewpoint and the position of the given object is smaller.

In some examples, for a respective object included in the subset, the selection circuitry can be configured to select at least some of the animation data associated with the respective object in dependence on a separation distance between the position of the viewpoint and a position of the respective object so that the selected animation data for the respective object has a first quality when the separation distance is less than a predetermined threshold value and has a second quality when the separation distance is greater than or equal to the first threshold value. Hence, a predetermined threshold value can be set for deciding whether, for a given object in the subset, first or second quality animation data is to be selected. Of course, one or more further threshold values may be used in this way so that animation data having a first, second or third quality can be selected depending on the separation distance.

Figure 6:
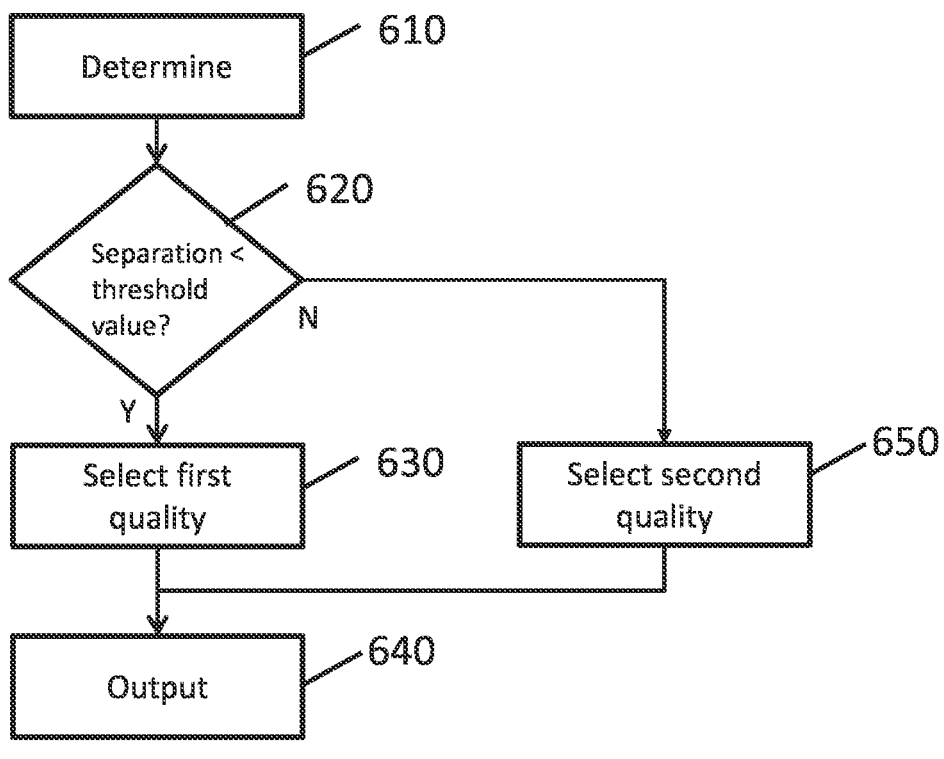
FIGS. 6 and 7 are schematic flowcharts illustrating methods for selecting animation data.

FIG. 6 is a schematic flowchart illustrating a method of selecting animation data for an animated object using a predetermined threshold value. The method comprises, determining (at a step 610) a subset of the animated objects of the computer generated environment for which animation data is to be selected. The step 610 may be performed using any of the techniques discussed above, such as the technique discussed with respect to FIG. 5. At the step 620, the method comprises determining whether a separation distance between a spatial property (e.g. one of a spatial coordinate and a viewpoint) indicated by an animation data request and a respective animated object of the subset is less than a predetermined threshold value. In response to determining that the separation distance is less than the predetermined threshold value, the method proceeds to the step 630 which comprises selecting animation data having a first quality for the respective animated object. At the step 640, the method comprises outputting the animation data selected at the step 630. In response to determining that the separation distance is not less than the predetermined threshold value, the method proceeds to the step 650 which comprises selecting animation data having a second quality for the respective animated object, the second quality being a lower quality than the first quality in this example. The method then proceeds to the step 640 which comprises outputting the animation data selected at the step 650.

In some embodiments of the disclosure, the selected animation data having the first quality has at least one of a different animation rate and a different polygonal mesh data resolution to the selected animation data having the second quality. Specifically, in the example of FIG. 6, the selected animation data having the first quality has a higher quality than the selected animation data having the second quality, and therefore the selected animation data having the first quality has at least one of a higher animation rate and a higher polygonal mesh data resolution relative to the selected animation data having the second quality.

The storage circuitry can store animation data (e.g. animation data 400) comprising one or more of animation frames and image frame. The animation frames comprises information specifying actions to be applied to model data to animate the model data. In some examples, the model data may comprise polygonal mesh data and/or point cloud data. Alternatively or in addition, the animation data may comprise image frames (e.g. key frames) depicting animations of animated objects. Selection can be performed to select animation data with a different animation rate by performing selection with respect to such frames.

An example will be described for a respective animated object for which the animation data that is stored by the storage circuitry comprises two or more polygonal meshes and an animation sequence comprising a sequence of frames specifying transform to be applied for animating any of the two or more polygonal meshes. The transforms may be defined for each successive frame, such that the temporal variation in the transformations corresponds to the polygonal mesh performing a particular motion. In particular, transforms can be associated with vertices of the polygonal mesh for specifying transformed to be applied to the vertices. The selection circuitry can select, from the animation data available for the respective animated object, at least some of the frames of the animation sequence. For example, each frame of the animation sequence can be selected when determining that animation data having a high quality is to be selected, whereas every other frame (or more generally 1 in every N frames, where N is an integer greater than or equal to two) can be selected when determining that animation data having a lower quality is to be selected. Hence, animation data having a lower animation rate can be selected for an animated object that is positioned far away from the viewpoint and thus a data size can be reduced for the selected animation data.

Alternatively or in addition, in some cases two or more polygonal meshes can be stored for a given animated object such that a first polygonal mesh having a higher mesh resolution and a second polygonal mesh having a lower mesh resolution are available for selection. The two or more polygonal meshes each represent a same object with a different level of detail by having a different number of vertices and polygons. For example, a highest resolution polygonal mesh may have been subjected to mesh decimation operations to obtain one or more lower resolution polygonal meshes for the same object. Hence, in a manner similar to that describe above, a selection can be made with respect to the two or more polygonal meshes so as to select a polygonal mesh with a resolution that is appropriate for the separation distance of the animated object and the viewpoint (or spatial coordinate) indicated by the animation data request.

In some embodiments of the disclosure, the selection circuitry is configured to select at least some of the animation data associated with a respective animated object in dependence on whether a size of the respective animated object and a separation distance between the position of the viewpoint and a position of the respective animated object satisfies a selection condition. In some cases, even though an animated object is determined to correspond to the portion of the computer generated environment for which animation data is to be selected, an animated object in the portion of the environment may be evaluated using the selection condition to determine whether to select animation data for that animated object. This can provide a greater level of control over which animated objects are included in the selected animation data. Hence, in some examples even though an object is included within a field-of-view of a viewpoint, the selection circuitry can be configured to select at least some of the animation data associated with the respective animated object in dependence on whether a size of the respective object and a separation distance between the position of the viewpoint and a position of the respective object satisfies the selection condition. The selection condition may therefore result in the animation data for that object not being selected based on a geometric size of the object and a separation distance between the object and the viewpoint.

In general, a separation distance between the position of the viewpoint and a position of a respective object can be calculated, and a geometric size of the respective object can be obtained from the animation data (e.g. an area associated with the polygonal mesh data). For a given object having a given size, the selection condition may be such that at least some of the animation data associated with the given object is selected when the separation distance is less than or equal to a threshold distance, and none of the animation data associated with the given object is selected when the separation distance is greater than the threshold distance. The selection condition may use a threshold distance that is calculated based on the geometric size of the object so that a smaller threshold distance is used for smaller sized objects and a larger threshold distance is used for larger sized object. Any suitable calculation may be used for calculating a threshold distance using a geometric size of an object and the threshold may vary linearly or non-linearly with object size.

In some examples, an animated object may be formed of a plurality of sub-elements that are interconnected. An example of this may be animated tree object which comprises a trunk, a plurality of branches and a plurality of leaves. In some cases, the above mentioned selection condition can be applied for the animated tree object as a whole, in which a total geometric size of the animated tree object is used. Alternatively, the above mentioned selection condition can be applied with respect to each of the sub-elements of the animated tree object. In this way, when positioned at a first separation distance, each sub-element may satisfy the selection condition (and therefore animation data for each sub-element of the tree is selected). When positioned at a second separation distance greater than the first separation distance, some of the smaller sub-elements do not satisfy the selection condition whilst the larger sub-elements still satisfy the selection condition (and therefore animation data for the larger sub-elements is selected whilst animation data for those smaller sub-elements is not selected), and with increasing separation distance more and more of the sub-elements are dropped from the selection.

In the above example, applying the selection condition with respect to each sub-element (also referred to as a sub-object) of the animated object can in some cases (such as animated objects comprising a large number of sub-elements) be processor intensive. Hence, in some embodiments of the disclosure, the sub-elements are grouped according to their geometric sizes to obtain at least two or more sub-element groups for the animated object. The selection condition can thus be applied for the first sub-element group based on a reference geometric size associated with the first sub-element group and the separation distance between the object and the viewpoint. Similarly, the selection condition can be applied for a second sub-element group based on a reference geometric size associated with the second sub-element group and the separation distance between the object and the viewpoint. The separation distance may correspond to a position of a largest sub-element forming the animated object (or an average or central position for the object) and may thus be the same for the first and second (and third and so on, if present) sub-element groups. The reference geometric size associated with the first sub-element group is different from the reference geometric size associated with the second sub-element group. The above mentioned grouping into the two or more sub-element groups may be performed by setting an upper size and a lower size for each sub-element group so that an object having a size between the upper size and lower size is allocated to that group. A mean of the upper size and a lower size for a given sub-element group may thus be used as the reference geometric size associated with that sub-element group. Alternatively, in other examples the geometric sizes of the sub-elements in a same sub-element group may be used to calculate an average (e.g. mean, median or mode)

size for the sub-element group and this may be used as the reference geometric size associated with that sub-element group.

Hence, the sub-elements can be grouped according to their geometric sizes to obtain at least two or more sub-element groups for the animated object, and the selection condition can be applied for a given sub-object group so that each sub-element in the given sub-element group either satisfies the selection condition or does not, and therefore animation data for each sub-element/sub-object in the given sub-element group is either selected or not selected. Hence more generally, in some embodiments of the disclosure, for a respective animated object corresponding to the spatial portion of the computer generated environment and which includes a plurality of interconnected sub-elements forming the respective animated object, the storage circuitry is configured to store metadata for the respective animated object indicative of two or more sub-element groups for the respective animated object, each sub-element corresponding to one of the two or more sub-element groups based on a size of that sub-element, and wherein the selection circuitry is configured to select at least some of the animation data associated with the sub-elements of a given sub-element group in dependence on whether a reference size associated with the given sub-element group and a separation distance between the position of the viewpoint and a position of the respective animated object satisfies the selection condition, the reference size being different for each of the two or more sub-element groups. The metadata can be generated in advance for one or more of the animated objects. In some cases, a condition of whether an animated object comprises at least A interconnected sub-elements (e.g. A may be a value in the range 2 to 5, and may specifically be set to a value of 3 in some cases, and can be freely set) may be used for determining whether to generate the metadata for the animated object. The respective sub-element groups can thus be used to group elements based on their geometric size (which may be a total area indicated by polygonal mesh data or a length of a major axis associated with the sub-element).

In some embodiments of the disclosure, the data processing apparatus 200 may comprise modifying circuitry (not shown in FIG. 2) to modify an aspect of the animation data stored by the storage circuitry. In particular, the modifying circuitry can be configured to modify an aspect of the stored animation data in dependence on a received animation data update request. The animation data update request may be received from a user's processing device (e.g. 101-1). Hence, a user can provide a user input and an animation data update request based on the user input can be received by the modifying circuitry for modifying an aspect of the stored animation data. For example, a user may interact with the computer generated environment to reconfigure (e.g. change a position and/or orientation of) an object and the animation data (e.g. a spatial coordinate associated with an animated object) may be updated accordingly. For example, a user can reconfigure an object with respect to the computer generated environment and the animation data can be updated so that following that reconfiguration the animation data specifies a new positon and/or orientation for the object. Alternatively or in addition, a user may select to add a new object to the animation data. For example, in a video game a user may select to drop an item at a location. Hence more generally, an aspect of the animation data for the computer generated environment can be modified according to an animation data update request from a user. Other users may subsequently request animation data and may receive animation data including one or more of the updates. For example, in the case of a virtual game world, a user may provide an update to place an object at a location, and subsequently when other users visit (or the same user revisits) that portion of the environment at a later time, the object still persists at the location.

In some embodiments of the disclosure, a system comprises: the data processing apparatus 200; and a processing device (e.g. 101-1) for executing a session of an interactive application associated with the computer generated environment, in which the processing device is configured to output one or more animation data requests to the data processing apparatus and receive a portion of the animation data, and the processing device is configured to generate images for display according to the received animation data. Image processing operations can be performed by the processing device using the received animation data to generate images for display by a display device (e.g. a display unit and/or a head mountable display unit) associated with the processing device. In some examples, the processing device 101-1 may comprise an HMD for outputting the images for display to a user wearing the HMD. In some examples, the animation data requests may be periodically output by the processing device for periodically requesting animation data.

It will be appreciated that a particular advantage of the present disclosure is that animations for one or more respective parts of a virtual environment can be pre-computed to provide animations (e.g. physically accurate and/or complex animations) that it would be difficult to compute within an entertainment device 10 within the time between rendered images at a target frame rate. In other words, by requesting pre-computed animations an entertainment device can maintain a target frame rate whilst providing such animations and/or provide richer or more complex animations for a same frame rate than if the entertainment device was computing all displayed animations itself. Similarly, the pre-computation of such animations also allows for a complexity that may not be possible to compute at the same time as running the game within the constraints of the entertainment device's working memory.

A related advantage is that the animations for a particular environment can themselves be made more complex; for example having different spring/summer/autumn/winter versions, or damaged/undamaged, or pre/post apocalypse, or otherwise having animation sequences that are much longer than traditional loops and that can be accessed using a time stamp to specify where within the animation the game state currently is (or conversely for the game state, what part of the longer animation sequence to serve).

By providing such animations on demand (e.g. by streaming when approaching the relevant region of the virtual environment), it reduces the need to limit the assets of a game to a size transmissible on recorded media, and also any initial download size. Where large games can occupy an appreciable fraction of the storage on an entertainment device, streaming animations in this manner contributes to enabling the user to be able to store more titles on their device at the same time.

Figure 7:
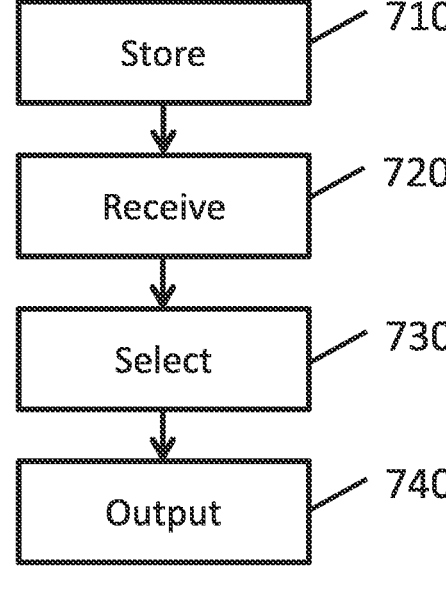

FIG. 7 is a schematic flowchart illustrating a computer-implemented method. The method comprises: storing (at a step 710) animation data for a computer generated environment, the animation data specifying animations of animated objects of the computer generated environment for a period of time; receiving (at a step 720) an animation data request; selecting (at a step 730) a portion of the animation data in dependence on the animation data request; and outputting (at a step 740) the portion of the animation data.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

Thus any required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

It will also be apparent that numerous modifications and variations of the present disclosure are possible in light of the above teachings. It is therefore to be understood that within the scope of the appended claims, the disclosure may be practised otherwise than as specifically described herein.

The invention claimed is:

1. A data processing apparatus comprising:
storage circuitry to store animation data for a computer generated environment, the animation data specifying animations of animated objects of the computer generated environment for a period of time;
selection circuitry to receive an animation data request and to select a portion of the animation data in dependence on the animation data request, wherein the animation data request is indicative of one or more animation data request properties including at least one of a position and an orientation of a viewpoint with respect to the computer generated environment, and wherein the selection circuitry is configured to select the portion of the animation data in dependence upon the one or more animation data request properties; and
output circuitry to output the portion of the animation data.

2. The data processing apparatus according to claim 1, wherein the selection circuitry is configured to select, as the portion of the animation data, one or more of:
animation data specifying animations for a subset of the animated objects of the computer generated environment; and
a time-based segment of the animation data for at least some of the computer generated environment, the time-based segment corresponding to a portion of the period of time.

3. The data processing apparatus according to claim 1, wherein the animation data request is indicative of at least one of a spatial coordinate with respect to the computer generated environment and a spatial portion of the computer generated environment.

4. The data processing apparatus according to claim 3, wherein for a respective animated object corresponding to the spatial portion of the computer generated environment, the selection circuitry is configured to select at least some of the animation data associated with the respective animated object in dependence on whether a size of the respective animated object and a separation distance between the position of the viewpoint and a position of the respective animated object satisfies a selection condition.

5. The data processing apparatus according to claim 3, wherein for a respective animated object corresponding to the spatial portion of the computer generated environment and which includes a plurality of interconnected sub-elements forming the respective animated object, the storage circuitry is configured to store metadata for a respective animated object indicative of two or more sub-element groups for the respective animated object, each of the plurality of interconnected sub-elements corresponding to one of the two or more sub-element groups based on a size of that sub-element, and wherein the selection circuitry is configured to select at least some of the animation data associated with the sub-elements of a given sub-element group in dependence on whether a reference size associated with the given sub-element group and a separation distance between the position of the viewpoint and a position of the respective animated object satisfies a selection condition, the reference size being different for each of the two or more sub-element groups.

6. The data processing apparatus according to claim 1, wherein the selection circuitry is configured to select animation data associated with a subset of the animated objects in the computer generated environment in dependence on at least one of the position and the orientation of the viewpoint with respect to the computer generated environment.

7. The data processing apparatus according to claim 6, wherein for a respective object included in the subset, the selection circuitry is configured to select at least some of the animation data associated with the respective object in dependence on a separation distance between the position of the viewpoint and a position of the respective object so that the selected animation data for the respective object has a first quality when the separation distance has a first value and has a second quality different from the first quality when the separation distance has a second value different from the first value.

8. The data processing apparatus according to claim 7, wherein the selected animation data having the first quality has at least one of a different animation rate and a different polygonal mesh data resolution to the selected animation data having the second quality.

9. The data processing apparatus according to claim 1, wherein the animation data request is indicative of at least one of a respective time and a time duration with respect to the period of time.

10. The data processing apparatus according to claim 9, wherein the animation data for the computer generated environment comprises timestamp information, and the selection circuitry is configured to select a time-based segment of the animation data within the period of time in dependence on the animation data request and the timestamp information.

11. The data processing apparatus according to claim 10, wherein the selection circuitry is configured to match a respective timestamp of the timestamp information with a timestamp associated with the animation data request and select a time-based segment of the animation data based on the respective timestamp of the timestamp information.

12. The data processing apparatus according to claim 1, wherein the animation data for the computer generated environment comprises a first predetermined portion of animation data for a first region of the computer generated environment and a second predetermined portion of animation data for a second region of the computer generated environment, and the selection circuitry is configured to select, as the portion of the animation data, one of the first predetermined portion and the second predetermined portion in dependence on the animation data request.

13. The data processing apparatus according to claim 1, wherein the animation data for the computer generated environment specifies animations of one or more non-humanoid animated objects.

14. The data processing apparatus according to claim 1, wherein the storage circuitry is configured to store the animation data for a first version of the computer generated environment and second version of the computer generated environment, the first version of the computer generated environment having a different visual appearance and different animations to the second version.

15. A method comprising:
    storing animation data for a computer generated environment, the animation data specifying animations of animated objects of the computer generated environment for a period of time;
    receiving an animation data request;
    selecting a portion of the animation data in dependence on the animation data request, wherein the animation data request is indicative of one or more animation data request properties including at least one of a position and an orientation of a viewpoint with respect to the computer generated environment, and wherein the selecting is in dependence upon the one or more animation data request properties; and
    outputting the portion of the animation data.

16. A non-transitory, computer readable storage medium containing computer software which when executed by a computer causes the computer to perform a method comprising:
    storing animation data for a computer generated environment, the animation data specifying animations of animated objects of the computer generated environment for a period of time;
    receiving an animation data request;
    selecting a portion of the animation data in dependence on the animation data request, wherein the animation data request is indicative of one or more animation data request properties including at least one of a position and an orientation of a viewpoint with respect to the computer generated environment, and wherein the selecting is in dependence upon the one or more animation data request properties; and
    outputting the portion of the animation data.

17. A data processing apparatus comprising:
    storage circuitry to store animation data for a computer generated environment, the animation data specifying animations of animated objects of the computer generated environment for a period of time;
    selection circuitry to receive an animation data request and to select a portion of the animation data in dependence on the animation data request, wherein the animation data request is indicative of one or more animation data request properties including a spatial portion of the computer generated environment, and wherein the selection circuitry is configured to select the portion of the animation data in dependence upon the one or more animation data request properties including, for a respective animated object corresponding to the spatial portion of the computer generated environment, selecting at least some of the animation data associated with the respective animated object in dependence on whether a size of the respective animated object and a separation distance between a position of a viewpoint and a position of the respective animated object satisfies a selection condition; and
output circuitry to output the portion of the animation data.

18. A method comprising:
    storing animation data for a computer generated environment, the animation data specifying animations of animated objects of the computer generated environment for a period of time;
    receiving an animation data request;
    selecting a portion of the animation data in dependence on the animation data request, wherein the animation data request is indicative of one or more animation data request properties including a spatial portion of the computer generated environment, and wherein selecting the portion of the animation data in dependence upon the one or more animation data request properties includes, for a respective animated object corresponding to the spatial portion of the computer generated environment, selecting at least some of the animation data associated with the respective animated object in dependence on whether a size of the respective animated object and a separation distance between a position of a viewpoint and a position of the respective animated object satisfies a selection condition; and
    outputting the portion of the animation data.

19. A data processing apparatus comprising:
    storage circuitry to store:
        animation data for a computer generated environment, the animation data specifying animations of animated objects of the computer generated environment for a period of time; and
        for a respective animated object including a plurality of interconnected sub-elements forming the respective animated object, metadata for the respective animated object indicative of two or more sub-element groups for the respective animated object, each of the plurality of interconnected sub-elements corresponding to one of the two or more sub-element groups based on a size of that sub-element;
    selection circuitry to receive an animation data request and to select a portion of the animation data in dependence on the animation data request, wherein the animation data request is indicative of one or more animation data request properties including a spatial portion of the computer generated environment, and wherein the selection circuitry is configured to select the portion of the animation data in dependence upon the one or more animation data request properties including, for a respective animated object corresponding to the spatial portion of the computer generated environment, at least some of the animation data associated with the sub-elements of a given sub-element group in dependence on whether a reference size associated with the given sub-element group and a separation distance between a position of a viewpoint and a position of the respective animated object satisfies a selection condition, the reference size being different for each of the two or more sub-element groups; and
    output circuitry to output the portion of the animation data.

20. A method comprising:
    storing animation data for a computer generated environment, the animation data specifying animations of animated objects of the computer generated environment for a period of time;

for a respective animated object including a plurality of interconnected sub-elements forming the respective animated object, storing metadata for the respective animated object indicative of two or more sub-element groups for the respective animated object, each of the plurality of interconnected sub-elements corresponding to one of the two or more sub-element groups based on a size of that sub-element;

receiving an animation data request;

selecting a portion of the animation data in dependence on the animation data request, wherein the animation data request is indicative of one or more animation data request properties including a spatial portion of the computer generated environment, and wherein the selecting is in dependence upon the one or more animation data request properties including, for a respective animated object corresponding to the spatial portion of the computer generated environment, selecting at least some of the animation data associated with the sub-elements of a given sub-element group in dependence on whether a reference size associated with the given sub-element group and a separation distance between a position of a viewpoint and a position of the respective animated object satisfies a selection condition, the reference size being different for each of the two or more sub-element groups; and outputting the portion of the animation data.

\*    \*    \*    \*    \*